United States Patent [19]
Hayashi et al.

[11] Patent Number: 5,790,282
[45] Date of Patent: Aug. 4, 1998

[54] APPARATUS AND METHOD FOR ADJUSTING COLOR IMAGE BY CHANGING SATURATION WITHOUT CHANGING BRIGHTNESS

[75] Inventors: Syuji Hayashi; Haruo Yamamoto, both of Osaka, Japan

[73] Assignee: Mita Industrial Co., Ltd., Osaka, Japan

[21] Appl. No.: 714,263

[22] Filed: Sep. 17, 1996

[30] Foreign Application Priority Data

Sep. 19, 1995 [JP] Japan ............................. 7-239856

[51] Int. Cl.$^6$ ..................... H04N 1/46; G03F 3/08
[52] U.S. Cl. ................................................. 358/520
[58] Field of Search ........................ 358/296, 298, 358/518, 520, 529, 530; 382/162, 167

[56] References Cited

U.S. PATENT DOCUMENTS

5,517,335  5/1996  Shu .......................... 358/520 X

*Primary Examiner*—Eric Frahm
*Attorney, Agent, or Firm*—Rabin & Champagne, P.C.

[57] ABSTRACT

An apparatus and method for color image adjustment which ensure proper saturation adjustment by a simple process. Color image data for three primary colors are adjusted so that the sum of the color image data for the three primary colors is kept unchanged before and after the adjustment. Thus, the saturation adjustment can be achieved without a change in the brightness of an image.

13 Claims, 7 Drawing Sheets

APPARATUS AND METHOD FOR ADJUSTING COLOR IMAGE BY CHANGING SATURATION WITHOUT CHANGING BRIGHTNESS

BACKGROUND OF THE INVENTION

1. Field of the Invention

The present invention relates to an apparatus and method for adjusting a color image, which are used, in particular, to adjust the saturation of a color image in an apparatus such as a color digital copying machine capable of color adjustment.

2. Description of Related Art

A color digital copying machine typically includes a scanner section for reading an original image and outputting image data, an image processing section for processing the image data outputted from the scanner section, and an image formation section for forming an image on the basis of the image data processed by the image processing section. The scanner section, for example, includes a color CCD (charge coupled device) for outputting three primary color signals on the basis of the additive process of red (R), green (G) and blue (B), and a color conversion section for converting the signals outputted from the color CCD into color image date on the basis of the subtractive process of cyan (C), magenta (M) and yellow (Y). The image formation section forms a color image on a paper sheet by using four color toners of cyan, magenta, yellow and black, for example, by an electrophotographic process.

The color digital copying machine is used not only for reproducing the color original image with a high fidelity but also for processing the original image with some intention. One mode of the processing of the original image is color adjustment. The color adjustment is to adjust the brightness, hue or saturation of an original image. The color adjustment allows the original image to be reproduced as an image different in brightness, hue or vividness from the original image.

One exemplary method for the saturation adjustment is a perfect achromatization. The achromatization allows a color original image to be reproduced as a monochrome image.

In general, an extremely complicated arithmetic operation is employed for the image data processing for the saturation adjustment. Therefore, the image data processing requires a large-scale image data processing circuit and a prolonged processing time.

Although the saturation adjustment may be achieved by way of a simplified image data processing operation, not only the saturation but also the brightness and hue of the original image may be changed. Therefore, the original image cannot necessarily be reproduced as intended.

SUMMARY OF THE INVENTION

It is a first object of the present invention to provide a color adjusting apparatus capable of properly adjusting the saturation of an image by a simple process.

It is a second object of the present invention to provide a color adjusting apparatus capable of changing the saturation of an image without changing the brightness of the image.

It is a third object of the present invention to provide an image forming apparatus capable of forming an image having a saturation properly adjusted by a simple process.

It is a fourth object of the present invention to provide a color adjusting method for properly adjusting the saturation of an image by a simple process.

It is a fifth object of the present invention to provide a color adjusting method for changing the saturation of an image without changing the brightness of the image.

In accordance with the present invention, image data for three primary colors are adjusted so that the sum of the respective image data for the three primary colors is kept unchanged before and after the color adjustment. Therefore, the saturation of an image can be properly adjusted without a change in the brightness of the image.

Even with a simplified process, proper saturation adjustment of the image can be achieved simply by keeping the sum of the respective image data for the three primary colors unchanged before and after the color adjustment. Therefore, the saturation adjustment dispenses with the use of a complicated process requiring a large-scale image data processing circuit and a prolonged process time.

The foregoing and other objects, features and effects of the present invention will become apparent from the following detailed description of the preferred embodiments with reference to the attached drawings.

DETAILED DESCRIPTION OF THE PREFERRED EMBODIMENTS

Figure 1:
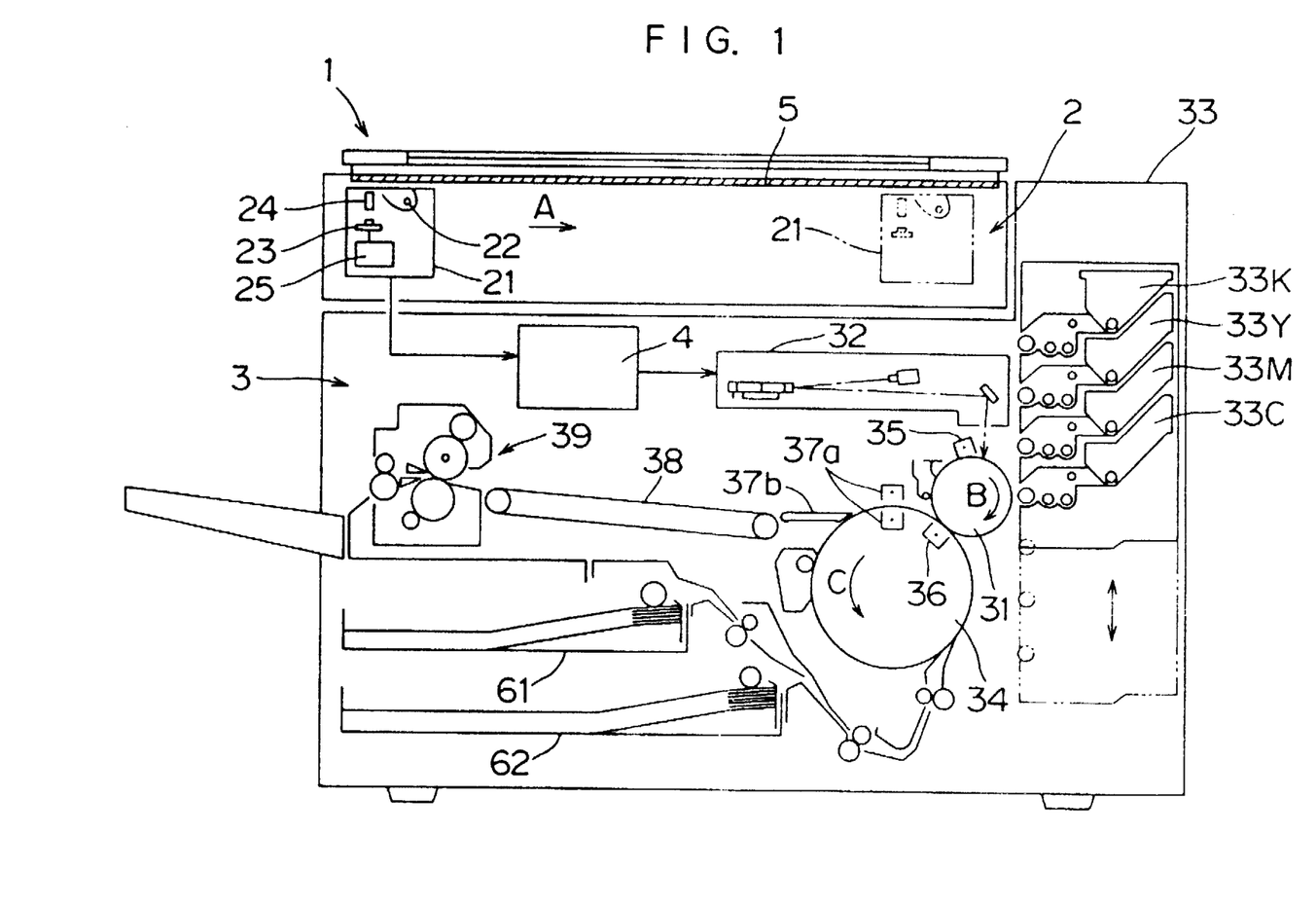
FIG. 1 is a schematic sectional view illustrating the internal construction of a digital color copying machine according to one embodiment of the present invention.

FIG. 1 is a schematic sectional view illustrating the internal construction of a digital color copying machine according to one embodiment of the present invention. The digital color copying machine includes a scanner section 2 for optically reading an original image, an image processing section 4 for processing the image read by the scanner section 2, and an output section 3 for reproducing the original image on a recording sheet on the basis of image data prepared by the image processing section 4, which are all accommodated in a copying machine body 1 thereof.

The scanner section 2 includes a scan reading section 21 reciprocally movable along an arrow A below a transparent document platen 5 on which a document original is placed. The scan reading section 21 includes a light source 22 for illuminating the document original, a color CCD 23 for sensing light reflected from the document original for photoelectric conversion, a selfoc lens 24 for focusing an optical image of the document original on the CCD 23, and a conversion circuit 25 for converting an output of the CCD 23 into digital color image data. The color CCD 23 has color filters, for example, of red (R), green (G) and blue (B) for each pixel, and outputs analog image signals for RGB components of each pixel. The conversion circuit 25 converts the analog image signals outputted from the CCD 23 into digital color image data indicative of the densities of cyan (C), magenta (M) and yellow (Y) components.

Cyan is a complementary color of red. Magenta is a complementary color of green, and yellow is a complementary color of blue. Therefore, where the respective color components are to be represented by image data of 256 gradation levels (8 bits) from 0 to 255, the relationship between the RGB color components and the CMY color components is represented by the following equations (1) to (3):

$$C=255-R \quad (1)$$

$$M=255-G \quad (2)$$

$$Y=255-B \quad (3)$$

The output section 3 forms an image by using toners of four colors, e.g., cyan, magenta, yellow and black (BK). More specifically, the output section 3 includes a photoreceptor drum 31, a laser scanning section 32 for forming an electrostatic latent image on the surface of the photoreceptor drum 31, a developing unit 33 for developing the electrostatic latent image formed on the surface of the photoreceptor drum 31 into a toner image, and a transfer drum 34 for receiving the toner image transferred thereon from the surface of the photoreceptor drum 31.

During the image formation, the photoreceptor drum 31 is rotated at a constant rate in a direction of an arrow B in FIG. 1, and the transfer drum 34 is rotated at a constant rate in a direction of an arrow C in FIG. 1. On the other hand, the laser scanning section 32 exposes the surface of the photoreceptor 31 to a laser beam modulated on the basis of the image data applied from the image processing section 4. Before the exposure, the surface of the photoreceptor drum 31 is uniformly charged by a main charger 35. Therefore, the formation of an electrostatic latent image corresponding to an image to be finally formed is achieved by selective exposure to the laser beam. The electrostatic latent image is developed into a toner image by the developing unit 33, and the toner image is transferred onto a paper sheet wound around the transfer drum 34 by a transfer unit 36. Reference numerals 61 and 62 are sheet feeding cassettes, from either of which the paper sheet is fed to the transfer drum 34.

The laser scanning section 32 forms four images for cyan, magenta, yellow and black on the photoreceptor drum 31 on a one-by-one basis. The four images for cyan, magenta, yellow and black are respectively developed with cyan, magenta, yellow and black toners by a cyan developing unit 33C, a magenta developing unit 33M, a yellow developing unit 33Y and a black developing unit 33K in the developing unit 33.

The four color toner images are transferred onto one sheet wound around the transfer drum 34, and superimposed one on another. The sheet carrying the four color toner images transferred thereon is removed from the transfer drum 34 by the operations of a separation discharger 37a, a separation claw 37b and the like, and then introduced into the fixing unit 39 through a transportation belt 38. The fixing unit 39 fixes toner particles on the sheet by heat and press, and then discharges the sheet outside the copying machine body 1.

Figure 2:
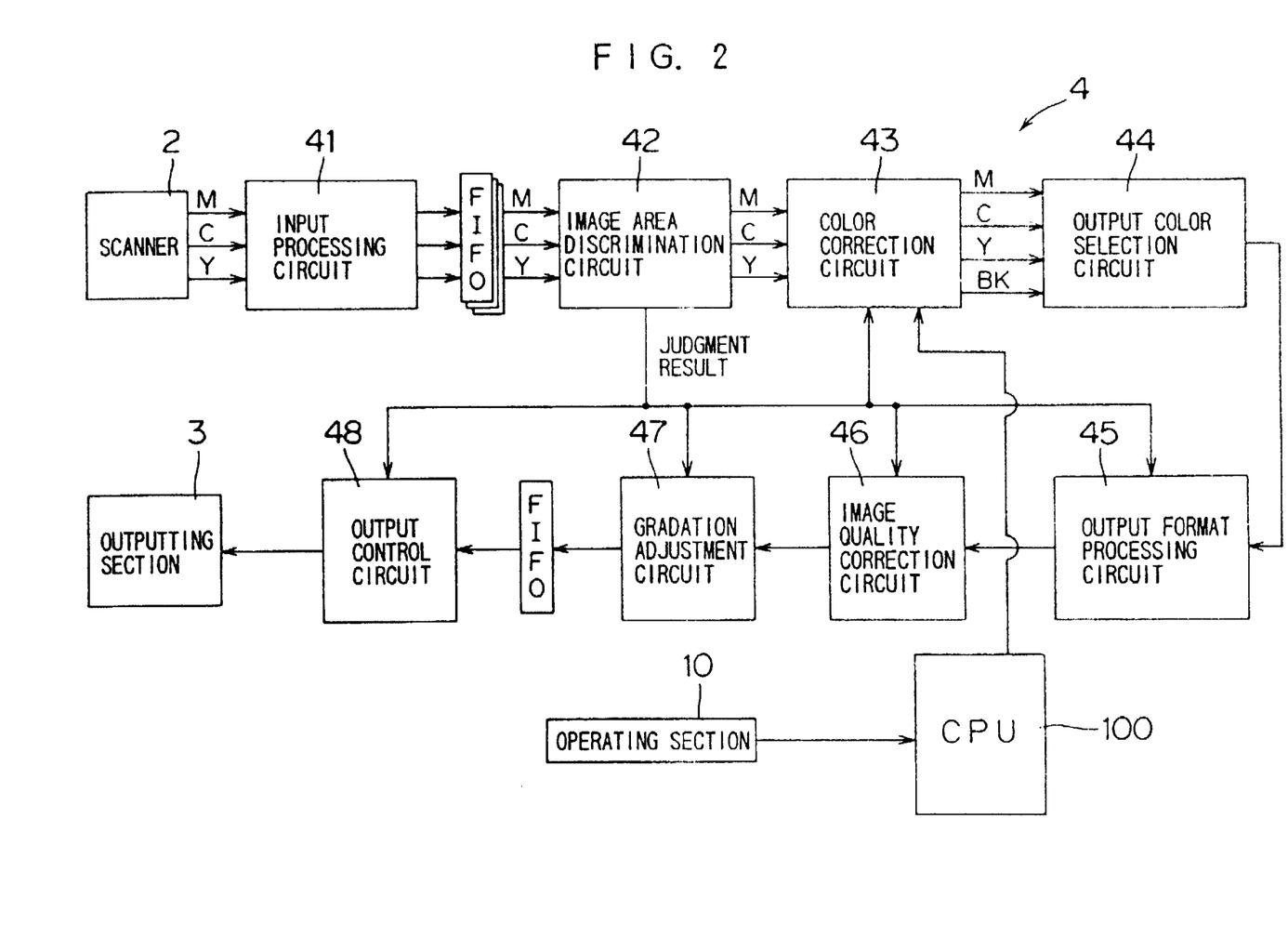
FIG. 2 is a block diagram illustrating the electrical construction of the digital color copying machine.

FIG. 2 is a block diagram for explaining the internal construction of the image processing section 4.

C-, M- and Y-color image data outputted from the scanner section 2 for each pixel are applied in parallel to an input processing circuit 41. The input processing circuit 41 removes image data of a margin of a document original to prevent image formation on a margin of a sheet, and performs a process for adjusting an image formation position on the sheet. Further, the input processing section 41 judges on the basis of density levels of the C-, M- and Y-components whether the inputted image is a color image or a monochrome image.

Data outputted from the input processing circuit 41 are applied to an image area discrimination circuit 42 via an FIFO (first-in first-out memory). The area discrimination circuit 42 judges which image area, among a character image area, a photographic area and a dotted image area, respective pixels belong to. The judgment result is applied to a color correction circuit 43, an output format circuit 45, an image quality correction circuit 46, a gradation adjustment circuit 47 and an output control circuit 48, and used for performing an appropriate process depending on the kinds of image areas to which the respective image pixels belong.

Figure 3:
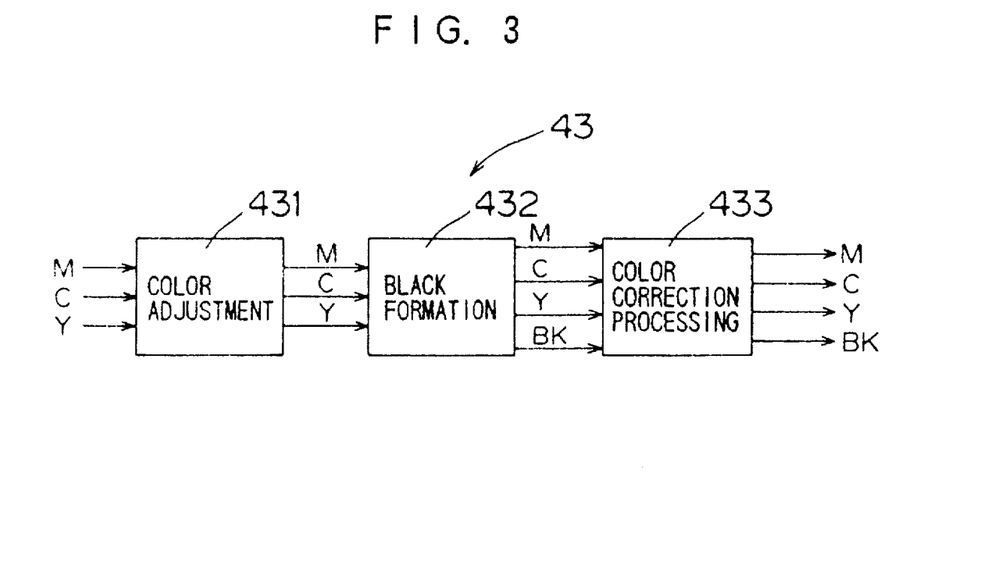
FIG. 3 is a block diagram illustrating the construction of a color correction circuit.

The image data subjected to the image area discrimination process are input to the color correction circuit 43. The color correction circuit 43 includes a color adjustment circuit 431, a black formation circuit 432 and a color correction processing circuit 433 as shown in FIG. 3. The color adjustment circuit 431 performs a color adjustment operation on the basis of an instruction from a CPU (central processing unit) to change the brightness, hue or saturation of the image. The black formation circuit 432 detects the minimum value among the image data of the C-, M- and Y-components. By multiplying the minimum value by a correction factor (e.g., 0.5 to 1.0), image data of a BK-component is generated. The product of the minimum value and the correction factor is subtracted from the image data of the C-, M- and Y-components. Further, the color correction processing circuit 433 performs a color correction processing operation on the inputted image data of the C-, M- and Y-components on the basis of optical characteristics of the color filters of the CCD 23 and spectral characteristics of C-, M- and Y-color toners.

The C-, M-, Y- and BK-image data from the color correction circuit 43 are inputted to an output color selection circuit 44. The output color selection circuit 44 selects and outputs the C-, M-, Y- and BK-image data on a one-by-one basis in this order to the output format processing circuit 45.

The output format processing circuit 45 performs a mirror image process, a zoom process, a parallel displacement process or the like on the basis of an instruction from the CPU 100 to process the image data in accordance with a desired output format.

An output of the output format processing circuit 45 is applied to the image quality correction circuit 46, which performs an outline emphasis process for enhancing the clarity of the image or a softening process for reducing the stiffness of the image. The image data outputted from the image quality correction circuit 46 are further subjected to a gradation adjustment process which is performed by the gradation adjustment circuit 47, and then applied to the output control circuit 48. The output control circuit 48 generates a laser irradiation signal which is to be applied to the laser scanning section 32 of the output section 3.

The CPU 100 centrally controls the respective components of the image processing section 4 ranging from the input processing circuit 41 to the output control circuit 48. The CPU 100 is connected to an operating section 10 provided on an upper face of the copying machine body 1 (see FIG. 1). The operating section 10 includes a start key for giving an instruction for starting a copying operation, ten keys for inputting the number of copies to be made, and color adjustment input keys for color adjustment operations (brightness adjustment, hue adjustment and saturation adjustment), for example.

Figure 4:
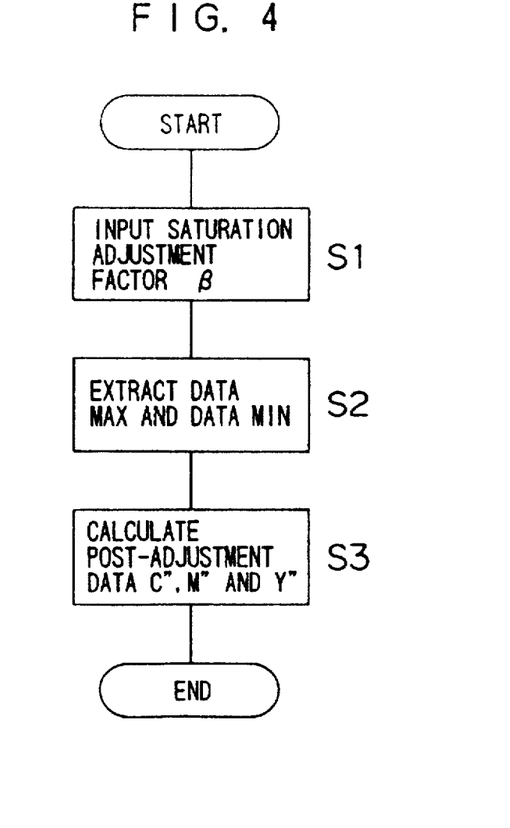
FIG. 4 is a flow chart for explaining a saturation adjustment process.

FIG. 4 is a flow chart for explaining the flow of a saturation adjustment process to be performed by the color adjustment circuit 431 of the color correction circuit 43. The color adjustment circuit 431 has, for example, a microprocessor including a program ROM and a RAM, and performs arithmetic operations on the basis of predetermined programs stored in the program ROM for a color adjustment process. The functions of the color adjustment circuit 431 may be performed by part of a software-based process to be performed by the CPU 100 on the basis of programs stored in another program ROM not shown.

For the adjustment of the saturation of an image, an operator operates the operating section 10 to input a saturation adjustment factor β(Step S1). A data signal indicative of the saturation adjustment factor β is applied to the color adjustment circuit 431 in the color correction circuit 43 via the CPU 100. The saturation adjustment factor β is set to a negative value when the image is to be reproduced as a vivid color image, and to a positive value when the image is to be reproduced as a less vivid color image for achromatization. When the saturation adjustment factor is set to 0.5, perfect achromatization is achieved.

In turn, the maximum data MAX and the minimum data MIN are selected from the C-, M- and Y-color image data (Step S2). That is, the maximum data MAX and the minimum data MIN are determined from the following equations:

$$MAX=MAX\{C,M,Y\} \quad (4)$$

$$MIN=MIN\{C,M,Y\} \quad (5)$$

wherein MAX{ } and MIN{ } represent the maximum data and the minimum data, respectively, among the parenthesized data. Further, data having an intermediate value are represented as data S.

Subsequently, saturation-adjusted image data C", M" and Y" are calculated on the basis of the saturation adjustment factor β, the maximum image data MAX, the intermediate image data S and the minimum image data MIN (Step S3). Thus, the saturation adjustment process is completed.

The saturation adjustment process in Step S3 is performed to satisfy the following equation (6). More specifically, the saturation adjustment is performed so that the sum of the image data C, M and Y before the saturation adjustment equals the sum of the image data C", M" and Y" after the saturation adjustment.

$$C+M+Y=C"+M"+Y" \quad (6)$$

Thus, the brightness of the image can be kept unchanged before and after the saturation adjustment.

The saturation adjustment process will be further detailed.

Figure 5:
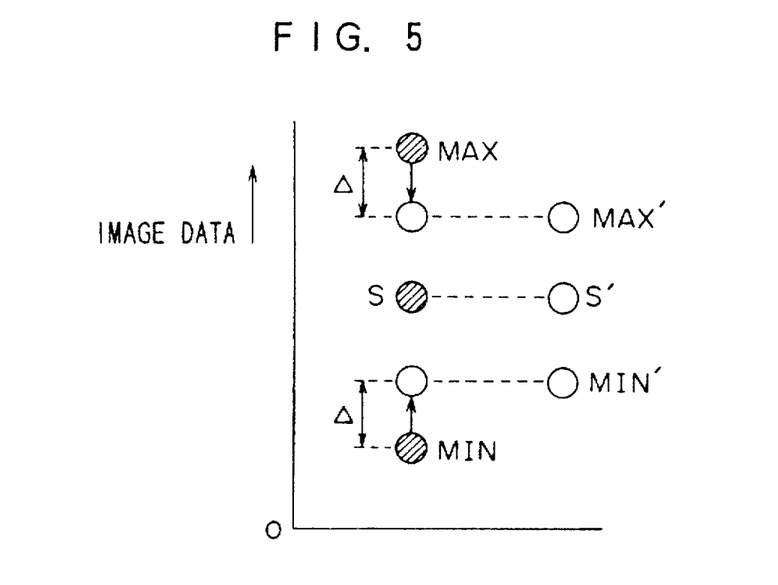
FIG. 5 is a graphical representation for explaining a process for reducing the saturation of an image (or an achromatization process)

FIG. 5 is a graphical representation for explaining a process for reducing the vividness of an image (or an achromatization process). The smaller the difference between the maximum image data MAX and the minimum image data MIN, the smaller the saturation of the image. Thus, the image becomes closer to achromatism (gray). The achromatization is achieved by reducing the maximum image data MAX by Δ and increasing the minimum image data MIN by Δ. That is, achromatized data MAX' and MIN' are obtained from the following equations (7) and (8):

$$MAX'=MAX-\Delta \quad (7)$$

$$MIN'=MIN+\Delta \quad (8)$$

Δ is obtained by multiplying a difference between the maximum image data MAX and the minimum image data MIN by the saturation adjustment factor β, i.e., calculated from the following equation (9):

$$\Delta=\beta (MAX-MIN) \quad (9)$$

To prevent the magnitude order of the image data obtained after the achromatization from being reversed with respect to the magnitude order of the image data before the achromatization, Δ is not set to a constant value, but to a value directly proportional to the difference between the maximum image data MAX and the minimum image data MIN. More specifically, the reversion of the magnitude order of the C-, M- and Y-image data results in a change in the shade (hue) of the image, so that the original image is reproduced as an image different in color therefrom.

Figure 6:
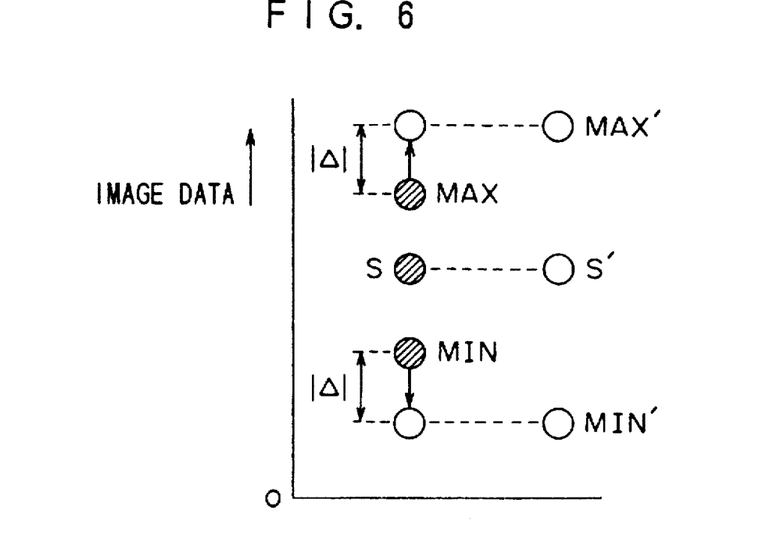
FIG. 6 is a graphical representation for explaining a process for increasing the saturation of an image (or a process for increasing the vividness of the image)

FIG. 6 is a graphical representation for explaining a saturation adjustment process for increasing the vividness of an image. When the saturation is to be increased, the saturation adjustment factor β is set to a negative value. Therefore, the post-adjustment data MAX' calculated from the aforesaid equation (7) takes a value greater by |Δ| than the original data MAX. Similarly, the post-adjustment data MIN' takes a value smaller by |Δ| than the original data MIN.

Figure 7:
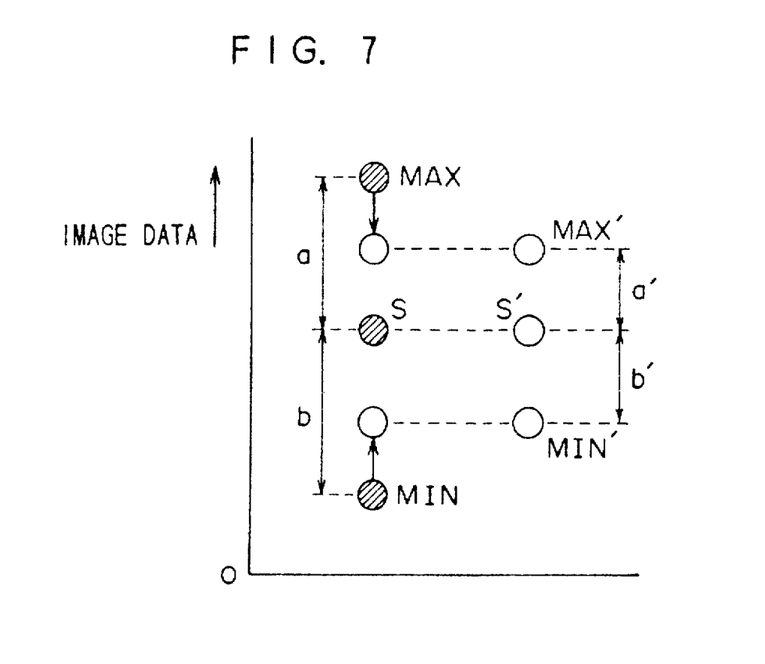
FIG. 7 is a graphical representation for explaining a process for processing data having an intermediate value.

FIG. 7 is a graphical representation for explaining a process for adjustment of data S having an intermediate value. The intermediate data S is corrected so that the ratio of (MAX-S):(S-MIN) before the adjustment equals the ratio of (MAX'-S'):(S'-MIN') after the adjustment.

More specifically, the correction is performed to satisfy the following equation (10):

$$\text{From } a:b=a':b'(a+b):b=(a'+b'):b' \quad (10)$$

wherein a=MAX-S, b=S-MIN, a'=MAX'-S' and b'=S'-MIN', as shown in FIG. 7.

Therefore, the post-adjustment data S' can be calculated from the following equation (11):

$$S' = \frac{MAX' - MIN'}{MAX - MIN} \times (S - MIN) + MIN' \quad (11)$$

Further, the following equation (12) is derived from the equations (7), (8) and (9):

$$S'=(1-2\beta)(S-MIN)+MIN+\beta(MAX-MIN) \quad (12)$$

Figure 8:
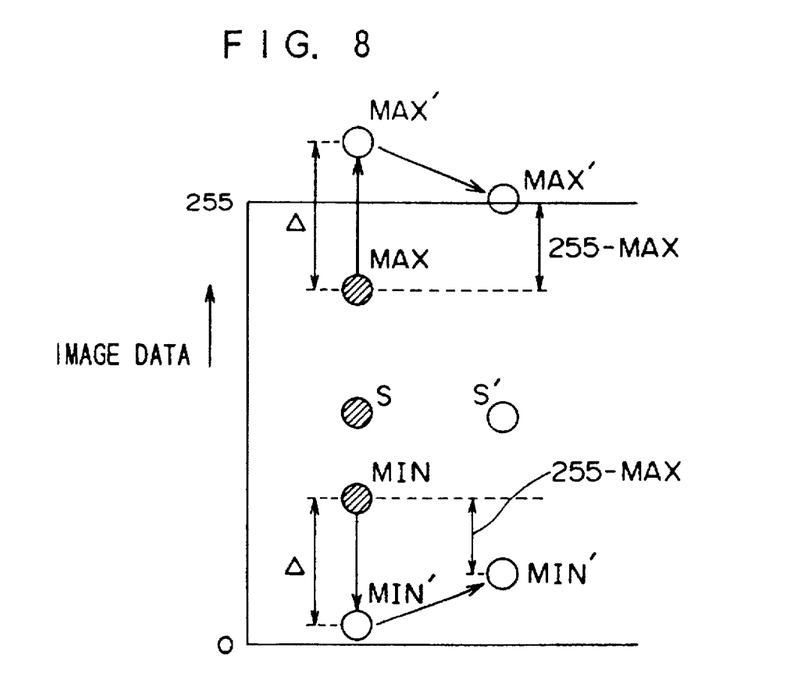
FIG. 8 is a graphical representation for explaining a process to be performed when a value of the maximum data obtained after the saturation adjustment exceeds a possible maximum value of image data.

As a result of the foregoing process, the post-adjustment value MAX' or MIN' may happen to exceed a possible maximum value of the image data or to fall below a possible minimum value, respectively. Where the image data are represented by 8 bits, for example, the post-adjustment data MAX' and MIN' can take any of values ranging from 0 to 255. In a case shown in FIG. 8, the value of the post-adjustment maximum data MAX' exceeds 255 as the result of the increase in the saturation. In a case shown in FIG. 9, on the other hand, the value of the post-adjustment minimum data MIN' falls below 0 as a result of the decrease in the saturation.

Where the post-adjustment maximum data MAX' calculated from the equation (7) exceeds 255 (MAX'>255), the image data are further corrected in the following manner. The maximum data MAX' is forcibly set to 255 as shown in the following equation (13). Then, the minimum data MIN' is obtained by subtracting (255–MAX) from MIN, i.e., calculated from the following equation (14):

$$MAX'=255 \quad (13)$$

$$MIN'=MIN-(255-MAX) \quad (14)$$

Figure 9:
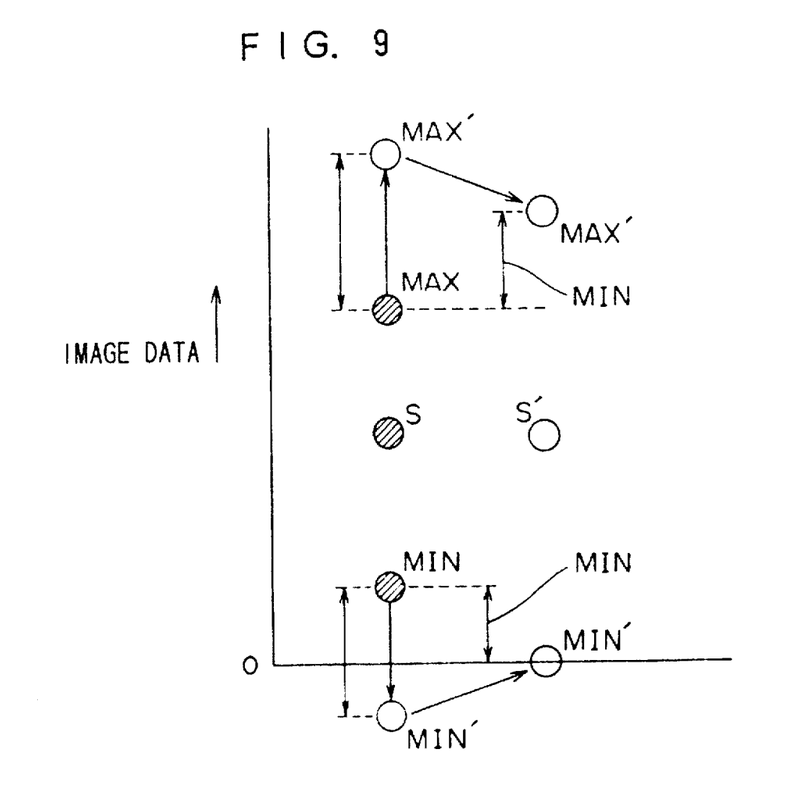
FIG. 9 is a graphical representation for explaining a process to be performed when a value of the minimum data obtained after the saturation adjustment falls below a possible minimum value of image data.

By substituting the equations (13) and (14) into the equation (11), the following equation (15) is obtained.

$$S' = \left\{ 1 - \frac{2(MAX - 255)}{MAX - MIN} \right\} \times (S - MIN) + MIN + MAX - 255 \quad (15)$$

Where the post-adjustment minimum data MIN' calculated from the equation (8) falls below 0 (MIN'<0), the image data are further corrected in the following manner. The minimum data MIN' is forcibly set to 0 as shown in the following equation (17). Then, the maximum data MAX' is obtained by adding MIN (=MIN–0) to MAX, i.e., calculated from the following equation (16):

$$MAX'=MAX+MIN \quad (16)$$

$$MIN'=0 \quad (17)$$

By substituting the equations (16) and (17) into the equation (11), the following equation (18) is obtained.

$$S' = \frac{MAX + MIN}{MAX - MIN} \times (S - MIN) \quad (18)$$

In the equation (18), if S=MAX, the right side thereof equals (MAX+MIN). If S=MIN, the right side thereof equals 0. Therefore, the equation (18) can be used for the calculation of the maximum data MAX' and the minimum data MIN'. Similarly, the equations (12) and (15) can be used for the calculation of the maximum data MAX' and the minimum data MIN'. Therefore, if the post-adjustment maximum data, minimum data and intermediate data are expressed by using S', and the pre-adjustment maximum data, minimum data and intermediate data are expressed by using S, the following equation is obtained.

$$S'=(1-2\beta)(S-MIN)+MIN+\beta(MAX-MIN) \quad <1>$$

However, where S=MIN and S'<0 in the equation <1>, the following equation <2> is used.

$$S' = \frac{MAX + MIN}{MAX - MIN} \times (S - MIN) \quad <2>$$

Where S=MAX and S'>255 in the equation <1>, the following equation <3> is used $$S' = \left\{ 1 - \frac{2(MAX - 255)}{MAX - MIN} \right\} \times (S - MIN) + MIN + MAX - 255 \quad <3>$$

In the equations <1>, <2> and <3>,

MAX: Maximum value among C-, M- and Y-image data
MIN: Minimum value among C-, M- and Y-image data
β: Saturation adjustment factor
S: Inputted C-, M- or Y-image data
S': Saturation-adjusted C-, M- or Y-image data However, only with the aforesaid saturation correction, a post-adjustment image may be different in brightness from the pre-adjustment image and, therefore, the saturation adjustment cannot necessarily be performed as intended by the operator. In particular, where a red color image is achromatized, a reproduced image is brighter than intended by the operator. When an original image including a yellow color portion and a red color portion is achromatized in accordance with the aforesaid process, the red and yellow color portions are reproduced to have substantially the same brightness. Since the yellow portion produces a brighter sensation and the red portion produces a less bright sensation in human eyes, the red portion should basically be reproduced to have a lower brightness.

Figure 10:
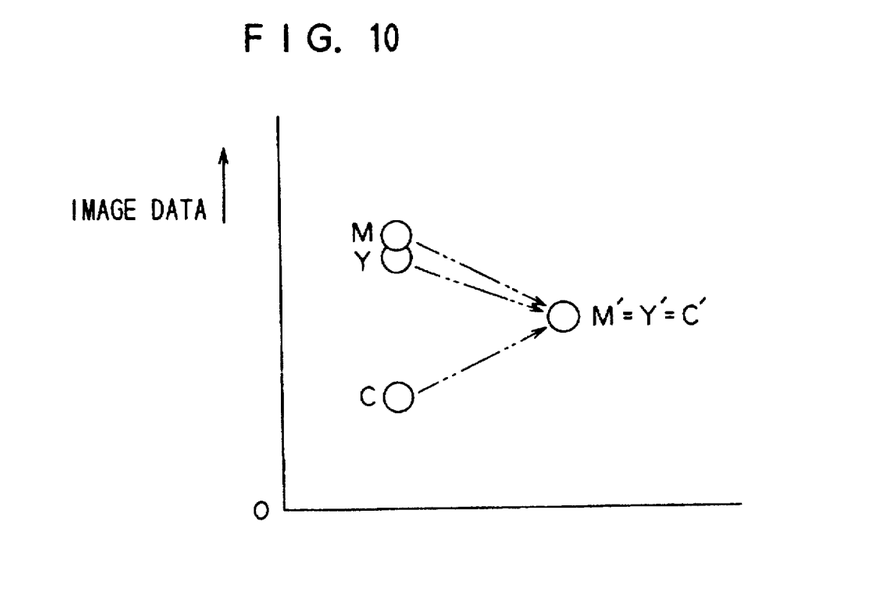
FIG. 10 is a graphical representation for explaining a change in the brightness observed when a red image is achromatized.
Figure 11A:
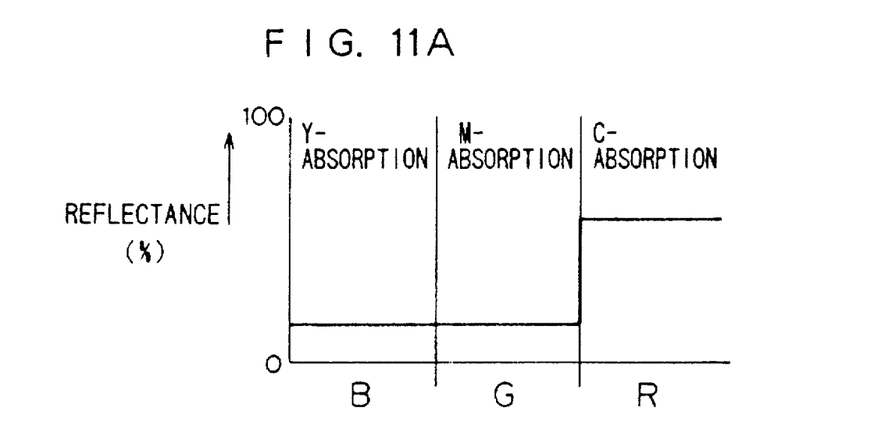
FIGS. 11A and 11B are graphical representations illustrating optical characteristics of the red image and the corresponding image data obtained before and after the saturation adjustment, respectively.
Figure 11B:
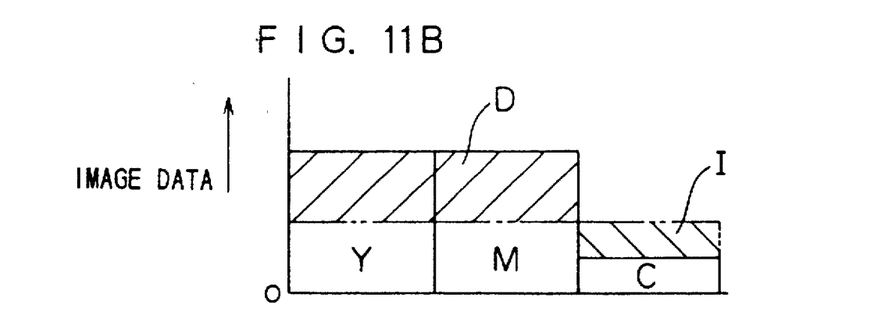

FIGS. 10, 11A and 11B are graphical representations for explaining the reasons why the aforesaid problem arises. A red image is represented by C-, M- and Y-image data with a magnitude order shown in FIG. 10. To achromatize the red image perfectly, the three color image data are corrected to have the same intermediate values. The red image has a spectrum shown in FIG. 11A, and image data indicative of C-, M- and Y-image densities as shown in Fig. 11B. After the correction, the image data have the same intermediate values as indicated by a two-dot dashed line in Fig. 11B. Therefore, the sum of the C-, M- and Y-image data is reduced by an area D and increased by an area I. As a result, the sum of the C-, M- and Y-image data is reduced, since the area D is larger than the area I. That is, the density of the image is lowered so that the brightness of the image is increased.

To prevent the change in the brightness associated with the saturation adjustment, additional adjustment is performed in accordance with this embodiment. Specifically, the equations <1>, <2> and <3> are corrected so that the sum of the image data C, M and Y before the saturation adjustment is equals the sum of the image data C", M" and Y" after the saturation adjustment.

More specifically, the final image data C", M" and Y" after the saturation adjustment are calculated from the following equations (19), (20) and (21), respectively. It is apparent that the sum of the right sides of the respective equations (19), (20) and (21) equals C+Y+M.

$$C" = C' \times \frac{C + M + Y}{C' + M' + Y'} \quad (19)$$

$$M" = M' \times \frac{C + M + Y}{V + M' + Y'} \quad (20)$$

$$Y" = Y' \times \frac{C + M + Y}{C' + M' + Y'} \quad (21)$$

Therefore, data MAX", S" and MIN" obtained after the saturation adjustment of the maximum data MAX, the intermediate data S, the minimum data MIN, respectively, among the C-, M- and Y-image data are calculated from the following equations (22), (23) and (24):

$$MAX" = MAX' \times \frac{MAX + S + MIN}{MAX' + S' + MIN'} \quad (22)$$

$$S" = S' \times \frac{MAX + S + MIN}{MAX' + S' + MIN'} \quad (23)$$

$$MIN" = MIN' \times \frac{MAX + S + MIN}{MAX' + S' + MIN'} \quad (24)$$

which are obtained by utilizing relationships expressed by C+M+Y=MAX+S+MIN and C'+M'+Y'=MAX'+S'+MIN'.

By substituting the equation <1> into the equations (22), (23) and (24), the following equations (25), (26) and (27) are obtained.

$$MAX'' = \frac{\{MAX(1-2\beta) + \beta(MAX+MIN)\} \times (MAX+S+MIN)}{S(1-2\beta) + (1+\beta)(MAX+MIN)} \quad (25)$$

$$= \frac{\{MAX(1-\beta) + \beta \cdot MIN\} \times (MAX+S+MIN)}{S(1-2\beta) + (1+\beta)(MAX+MIN)}$$

$$S'' = \frac{\{S(1-2\beta) + \beta(MAX+MIN)\} \times (MAX+S+MIN)}{S(1-2\beta) + (1+\beta)(MAX+MIN)} \quad (26)$$

$$MIN'' = \frac{\{MIN(1-2\beta) + \beta(MAX+MIN)\} \times (MAX+S+MIN)}{S(1-2\beta) + (1+\beta)(MAX+MIN)} \quad (27)$$

$$= \frac{\{MIN(1-\beta) + \beta \cdot MAX\} \times (MAX+S+MIN)}{S(1-2\beta) + (1+\beta)(MAX+MIN)}$$

A confirmation of MAX"+S"+MIN"=MAX+S+MIN can readily be made by respectively adding the left sides and the right sides of the equations (25), (26) and (27). More specifically, an image having the same brightness as the original image but a different saturation therefrom can be provided by converting the original image data in accordance with the equations (25), (26) and (27) for the saturation adjustment.

Where S=MIN in the equation <1> and S'<0, the following equations (28), (29) and (30) are obtained by substituting the equation <2> into the equation (22), (23) and (24).

$$MAX'' = \frac{(MAX+MIN)(MAX+S+MIN)}{\frac{(MAX+MIN)(S-MIN)}{MAX-MIN} + (MAX+MIN)} \quad (28)$$

$$= \frac{MAX+S+MIN}{\frac{S-MIN}{MAX+MIN} + 1}$$

$$S'' = \frac{\frac{(MAX+MIN)(S-MIN)}{MAX-MIN} \times (MAX+S+MIN)}{\frac{(MAX+MIN)(S-MIN)}{MAX-MIN} + (MAX+MIN)} \quad (29)$$

$$= \frac{\frac{S-MIN}{MAX-MIN} \times (MAX+S+MIN)}{\frac{S-MIN}{MAX-MIN} + 1}$$

$$MIN'' = \frac{\frac{(MAX+MIN)(MIN-MIN)}{MAX-MIN} \times (MAX+S+MIN)}{\frac{(MAX+MIN)(S-MIN)}{MAX-MIN} + (MAX+MIN)} \quad (30)$$

$$= 0$$

A confirmation of MAX"+S"+MIN"=MAX+S+MIN can readily be made by respectively adding the left sides and the right sides of the equations (28), (29) and (30).

Where S=MAX in the equation <1> and S'>255, the following equations (31), (32) and (33) can be obtained by substituting the equation <3> into the equations (22), (23) and (24).

$$MAX'' = \frac{255(MAX+S+MIN)}{\left\{1 - \frac{2(MAX-255)}{MAX-MIN}\right\} \times (S-MIN) + MAX+MIN} \quad (31)$$

$$S'' = \frac{\left[\left\{1 - \frac{2(MAX-255)}{MAX-MIN}\right\} \times (S-MIN) + MIN + MAX - 255\right] \times (MAX+S+MIN)}{1 - \frac{2(MAX-255)}{MAX-MIN} \times (S-MIN) + MIN + MAX} \quad (32)$$

$$MIN'' = \frac{(MAX+MIN-255) \times (MAX+S+MIN)}{\left\{1 - \frac{2(MAX-255)}{MAX-MIN}\right\} \times (S-MIN) + MIN + MAX} \quad (33)$$

A confirmation of MAX"+S"+MIN"=MAX+S+MIN can readily be made by respectively adding the left sides and the right sides of the equations (31), (32) and (33).

In Step S3 shown in FIG. 4, the saturation-adjusted image data C", M" and Y" are obtained by converting the input image data C, M and Y by way of the conversion equations (26) to (33).

In accordance with this embodiment, a relatively simple saturation adjustment process is performed such that the maximum image density data and the minimum image density data among C-, M- and Y-image data are changed in opposite directions (in an increasing direction and in a decreasing direction) and the magnitude order of the resulting C-, M- and Y-image data is conformable to the magnitude order of the original C-, M- and Y-image data. In addition, the sum of the image data is kept unchanged before and after the adjustment, whereby a change in the brightness can be prevented. Even with the simplified saturation adjustment process, saturation adjustment such as achromatization can be properly performed without a change in the brightness. Where a color original image including a yellow portion and a red portion is achromatized, for example, the yellow portion is reproduced more brightly, and the red portion is reproduced less brightly. Thus, the saturation adjustment can be performed in conformity with the sensation of the human eye. Further, the simplified saturation adjustment process does not require complicated circuitry for the saturation adjustment nor complicated process steps.

While the embodiment of the present invention has thus been described, the invention is not limited to the aforesaid embodiment. The simplified saturation adjustment process described in the embodiment is merely one example. Any other technique may be employed to keep the sum of image data unchanged before and after the adjustment.

Although the present invention is applied to the digital color copying machine in the aforesaid embodiment, the invention can be widely applied to any of various apparatus such as color facsimile machines and image scanners which are capable of performing saturation adjustment. Further, the invention can be applied to an image processing operation to be performed by a personal computer.

Although the present invention has been described in detail by way of an embodiment thereof, it should be understood that the foregoing disclosure is merely illustrative of the technical principles of the present invention but not limiting of the same. The scope of the present invention is limited only by the appended claims.

What is claimed is:

1. An apparatus for adjusting a saturation of a color image by processing color image data corresponding to three primary colors, the apparatus comprising:

data adjustment means for adjusting the respective color image data for the three primary colors to change the saturation of the color image, and outputting post-adjustment color image data for the three primary colors;

the data adjustment means including data calculation means for calculating the respective post-adjustment color image data by converting the color image data for the three primary colors on the basis of predetermined conversion equations so that a sum of the respective post-adjustment color image data equals a sum of the respective color image data before the adjustment;

wherein the data calculation means includes:

data increment/decrement means for respectively changing maximum image data and minimum image data among the color image data for the three primary colors by predetermined values different in sign but equivalent in magnitude; and means for adjusting image data having an intermediate value among the color image data for the three primary colors to a value such that a magnitude relationship of the respective post-adjustment color image data is analogous to a magnitude relationship of the respective color image data before the adjustment;

the apparatus further comprising:

means for, if data obtained by incrementing the maximum image data by means of the data increment/decrement means is to exceed a possible upper limit value of the image data, replacing the data with the upper limit value; and means for, if the data obtained by incrementing the maximum image data by means of the data increment/decrement means is to exceed the possible upper limit value, decreasing the minimum image data by a difference between the maximum image data and the upper limit value.

2. An apparatus as set forth in claim 1, further comprising:

means for, if data obtained by decrementing the minimum image data by means of the data increment/decrement means is to fall below a possible lower limit value of the image data, replacing the data with the lower limit value; and means for, if the data obtained by decrementing the minimum image data by means of the data increment/decrement means is to fall below the possible lower limit value, increasing the maximum image data by a difference between the minimum image data and the lower limit value.

3. An apparatus as set forth in claim 1, further comprising input means for inputting a saturation adjustment factor $\beta$.

4. An apparatus for adjusting a saturation of a color image by processing color image data corresponding to three primary colors, the apparatus comprising:

data adjustment means for adjusting the respective color image data for the three primary colors to change the saturation of the color image, and outputting post-adjustment color image data for the three primary colors;

the data adjustment means including data calculation means for calculating the respective post-adjustment color image data by converting the color image data for the three primary colors on the basis of predetermined conversion equations, so that a sum of the respective post-adjustment color image data equals a sum of the respective color image data before the adjustment;

wherein the data calculation means includes:

first means for converting the respective color image data S for the three primary colors into corrected color image data S' for the three primary colors on the basis of the following equation:

$$S' = (1-2\beta)(S-MIN) + MIN + \beta(MAX-MIN)$$

wherein $\beta$ is a saturation adjustment factor, MIN is a minimum value among the color image data for the three primary colors before the adjustment, and MAX is a maximum value among the color image data for the three primary colors before the adjustment; and second means for converting the respective corrected color image data S' into the post-adjustment color image data S" on the basis of the following equation:

$$S" = \frac{C+M+Y}{C'+M'+Y'} \times S'$$

wherein C, M and Y are the respective color image data S for the three primary colors before the adjustment, and C', M' and Y' are the respective corrected color image data S' for the three primary colors obtained by way of the conversion by the first means.

5. An apparatus as set forth in claim 4, wherein the first means includes:

means for, if a value obtained by the conversion of the maximum color image data MAX exceeds an upper limit value ULV, obtaining the data S' after the conversion on the basis of the following equation:

$$S' = \left\{ 1 - \frac{2(MAX-ULV)}{MAX-MIN} \right\} \times (S-MIN) + MIN + MAX - ULV$$

and means for, if a value obtained by the conversion of the minimum color image data MIN falls below a lower limit value LLV, obtaining the data S' after the conversion on the basis of the following equation:

$$S' = \frac{MAX+MIN+LLV}{MAX-MIN} \times (S-MIN) + LLV.$$

6. An apparatus for adjusting a saturation of a color image by processing color image data corresponding to three primary colors, the apparatus comprising:

data adjustment means for adjusting the respective color image data for the three primary colors to change the saturation of the color image, and outputting post-adjustment color image data for the three primary colors;

the data adjustment means including data calculation means for calculating the respective post-adjustment color image data by converting the color image data for the three primary colors on the basis of predetermined conversion equations so that a sum of the respective post-adjustment color image data equals a sum of the respective color image data before the adjustment;

wherein the data calculation means includes: means for obtaining the post-adjustment color image data on the basis of the following equations:

$$MAX" = \frac{\{MAX(1-\beta) + \beta \cdot MIN\} \times (MAX+S+MIN)}{S(1-2\beta) + (1+\beta)(MAX+MIN)}$$

$$S" = \frac{\{S(1-2\beta) + \beta(MAX+MIN)\} \times (MAX+S+MIN)}{S(1-2\beta) + (1+\beta)(MAX+MIN)}$$

-continued $$MIN'' = \frac{\{MIN(1-\beta)+\beta \cdot MAX\} \times (MAX+S+MIN)}{S(1-2\beta)+(1+\beta)(MAX+MIN)}$$

wherein β is a saturation adjustment factor; MAX is a maximum value among the color image data for the three primary colors before the adjustment; S is an intermediate value among the color image data for the three primary colors before the adjustment; MIN is a minimum value among the color image data for the three primary colors before the adjustment; MAX" is post-adjustment color image data corresponding to the data MAX; S" is post-adjustment color image data corresponding to the data S; and MIN" is post-adjustment color image data corresponding to the data MIN.

7. An apparatus as set forth in claim 6, wherein the data calculation means includes:

means for, if a value obtained by the conversion of the maximum color image data MAX exceeds an upper limit value ULV, obtaining the post-adjustment data on the basis of the following equations:

$$MAX'' = \frac{ULV(MAX+S+MIN)}{\left\{1-\frac{2(MAX-ULV)}{MAX-MIN}\right\} \times (S-MIN)+MIN+MAX}$$

$$S'' = \frac{\left[\left\{1-\frac{2(MAX-ULV)}{MAX-MIN}\right\} \times (S-MIN)+MIN+MAX-ULV\right] \times (MAX+S+MIN)}{1-\frac{2(MAX-ULV)}{MAX-MIN} \times (S-MIN)+MIN+MAX}$$

$$MIN'' = \frac{(MAX+MIN-ULV) \times (MAX+S+MIN)}{\left\{1-\frac{2(MAX-ULV)}{MAX-MIN}\right\} \times (S-MIN)+MIN+MAX}$$

and means for, if a value obtained by the conversion of the minimum color image data MIN falls below zero, obtaining the post-adjustment data on the basis of the following equations:

$$MAX'' = \frac{MAX+S+MIN}{\frac{S-MIN}{MAX-MIN}+1}$$

$$S'' = \frac{\frac{S-MIN}{MAX-MIN} \times (MAX+S+MIN)}{\frac{S-MIN}{MAX-MIN}+1}$$

$$MIN'' = 0.$$

8. A method for adjusting a saturation of a color image by processing color image data corresponding to three primary colors, the method comprising:

acquiring saturation adjustment information;

preparing saturation-adjusted color image data for the three primary colors by adjusting the respective color image data for the three primary colors on the basis of the saturation adjustment information, so that a sum of the respective saturation-adjusted color image data equals a sum of the respective color image data before the adjustment, the color image data preparation including respectively changing maximum image data and minimum image data among the color image data for the three primary colors by predetermined values different in sign but equivalent in magnitude for data increment and decrement, and adjusting image data having an intermediate value among the color image data for the three primary colors to a value such that a magnitude relationship of the respective saturation-adjusted color image data is analogous to a magnitude relationship of the respective color image data before the adjustment;

if data obtained by incrementing the maximum image data in the data increment/decrement operation is to exceed a possible upper limit value of the image data, replacing the data with the upper limit value; and if the data obtained by incrementing the maximum image data in the data increment/decrement operation is to exceed the possible upper limit value, decreasing the minimum image data by a difference between the maximum image data and the upper limit value.

9. A method for adjusting a saturation of a color image by processing color image data corresponding to three primary colors, the method comprising:

acquiring saturation adjustment information;

preparing saturation-adjusted color image data for the three primary colors by adjusting the respective color image data for the three primary colors on the basis of the saturation adjustment information, so that a sum of the respective saturation-adjusted color image data equals a sum of the respective color image data before the adjustment, the color image data preparation including respectively changing maximum image data and minimum image data among the color image data for the three primary colors by predetermined values different in sign but equivalent in magnitude for data increment and decrement, and adjusting image data having an intermediate value among the color image data for the three primary colors to a value such that a magnitude relationship of the respective saturation-adjusted color image data is analogous to a magnitude relationship of the respective color image data before the adjustment;

if data obtained by decrementing the minimum image data in the data increment/decrement operation is to fall below a possible lower limit value of the image data, replacing the data with the lower limit value; and if the data obtained by decrementing the minimum image data in the data increment/decrement operation is to fall below the possible lower limit value, increasing the maximum image data by a difference between the minimum image data and the lower limit value.

10. An apparatus for adjusting a saturation of a color image by processing color image data corresponding to three primary colors and forming a saturation-adjusted image, the apparatus comprising:

data adjustment means for adjusting the respective color image data for the three primary colors to change the saturation of the color image and outputting post-adjustment color image data for the three primary colors, the data adjustment means including data calculation means for calculating the respective post-adjustment color image data by converting the color image data for the three primary colors on the basis of predetermined conversion equations so that a sum of the respective post-adjustment color image data equals a sum of the respective color image data before the adjustment, the data calculation means including data increment/decrement means for respectively changing maximum image data and minimum image data among the color image data for the three primary colors by predetermined values different in sign but equivalent in magnitude and means for adjusting image data having an intermediate value among the color image data for the three primary colors to a value such that a magnitude relationship of the respective post-adjustment color image data is analogous to a magnitude relationship of the respective color image data before the adjustment; and image formation means for performing an image forming operation an the basis of the post-adjustment color image data outputted from the data adjustment means;

means for, if data obtained by incrementing the maximum image data by means of the data increment/decrement means is to exceed a possible upper limit value, replacing the data with the upper limit value; and means for, if the data obtained by incrementing the maximum image data by means of the data increment/decrement means is to exceed the possible upper limit value, decreasing the minimum image data by a difference between the maximum image data and the upper limit value.

11. An apparatus for adjusting a saturation of a color image by processing color image data corresponding to three primary colors and forming a saturation-adjusted image, the apparatus comprising:

data adjustment means for adjusting the respective color image data for the three primary colors to change the saturation of the color image and outputting post-adjustment color image data for the three primary colors, the data adjustment means including data calculation means for calculating the respective post-adjustment color image data by converting the color image data for the three primary colors on the basis of predetermined conversion equations so that a sum of the respective post-adjustment color image data equals a sum of the respective color image data before the adjustment, the data calculation means including data increment/decrement means for respectively changing maximum image data and minimum image data among the color image data for the three primary colors by predetermined values different in sign but equivalent in magnitude and means for adjusting image data having an intermediate value among the color image data for the three primary colors to a value such that a magnitude relationship of the respective post-adjustment color image data is analogous to a magnitude relationship of the respective color image data before the adjustment;

image formation means for performing an image forming operation an the basis of the post-adjustment color image data outputted from the data adjustment means;

means for, if data obtained by decrementing the minimum image data by means of the data increment/decrement means is to fall below a possible lower limit value, replacing the data with the lower limit value; and means for, if the data obtained by decrementing the minimum image data by means of the data increment/decrement means is to fall below the possible lower limit value, increasing the maximum image data by a difference between the minimum image data and the lower limit value.

12. An apparatus for adjusting a saturation of a color image by processing color image data corresponding to three primary colors, the apparatus comprising:

data adjustment means for adjusting the respective color image data for the three primary colors to change the saturation of the color image, and outputting post-adjustment color image data for the three primary colors, the data adjustment means including data calculation means for calculating the respective post-adjustment color image data by converting the color image data for the three primary colors on the basis of predetermined conversion equations so that a sum of the respective post-adjustment color image data equals a sum of the respective color image data before the adjustment, the data calculation means including data increment/decrement means for respectively changing maximum image data and minimum image data among the color image data for the three primary colors by predetermined values different in sign but equivalent in magnitude, and means for adjusting image data having an intermediate value among the color image data for the three primary colors to a value such that a magnitude relationship of the respective post-adjustment color image data is analogous to a magnitude relationship of the respective color image data before the adjustment;

means for, if data obtained by decrementing the minimum image data by means of the data increment/decrement means is to fall below a possible lower limit value of the image data, replacing the data with the lower limit value; and means for, if the data obtained by decrementing the minimum image data by means of the data increment/decrement means is to fall below the possible lower limit value, increasing the maximum image data by a difference between the minimum image data and the lower limit value.

13. The according to claim 12, further comprising input means for inputting a saturation adjustment factor $\beta$.

* * * * *